United States Patent [19]
Fodor et al.

[11] Patent Number: 5,496,142
[45] Date of Patent: Mar. 5, 1996

[54] SLOTTED CONICAL SPRING WASHER

[75] Inventors: Mark A. Fodor, Los Gatos; Craig Bercaw, Sunnyvale; Charles Dornfest, Fremont, all of Calif.

[73] Assignee: Applied Materials, Inc., Santa Clara, Calif.

[21] Appl. No.: 94,674

[22] Filed: Jul. 20, 1993

[51] Int. Cl.$^6$ .......................... F16B 39/24; F16B 43/02; H01R 4/38
[52] U.S. Cl. .................. 411/544; 411/156; 411/368; 411/916; 439/815
[58] Field of Search ........................... 411/155, 156, 411/368, 10–12, 544, 533, 916; 439/815

[56] References Cited

U.S. PATENT DOCUMENTS

| | | | |
|---|---|---|---|
| 2,464,152 | 3/1949 | Ralston | 411/11 |
| 2,771,591 | 11/1956 | Vordtriede | 411/916 |
| 2,779,375 | 1/1957 | O'Connor | 411/533 X |
| 3,009,176 | 11/1961 | Knocke | 411/533 X |
| 3,041,574 | 6/1962 | Cornell, Jr. | 411/544 |
| 3,503,430 | 3/1970 | Tsurumoto | 411/155 X |
| 4,302,136 | 11/1981 | Abe et al. | 411/156 X |
| 4,958,970 | 9/1990 | Rose et al. | 411/544 X |
| 5,316,319 | 5/1994 | Suggs | 411/544 X |

FOREIGN PATENT DOCUMENTS

| | | | |
|---|---|---|---|
| 687464 | 1/1940 | Germany | 411/155 |

OTHER PUBLICATIONS

Drawing of Slotted Washer, 3/16" (#10) Spring, Inconel X–750, NI Plated, Size C, Drawing No. 0015–MF112, Rev. F1, Dated Nov. 10, 1991.

Drawing of Slotted Washer, #6 Spring, Inconel X–750, NI Plated, Size C, Drawing No. 0015–MF121, Rev. E1.

*Primary Examiner*—Neill R. Wilson
*Attorney, Agent, or Firm*—Janis Biksa; Charles S. Guenzer

[57] ABSTRACT

A slotted conical (non-flat) spring washer with an encircling ring provides improved spring washer performance. A split or slotted conical spring washer is encircled by a retaining ring that prevents the ends of the washer adjacent to the slot from expanding as the washer is compressed. The ends of the washer on both sides of the slot move to prevent the washer material from exceeding its yield strength. The ring restricts the radial movement of said outside diameter of the washer strip away from a center axis of the washer bore. The ring can be a counter bore in a member to be clamped, a retaining washer having an outside annular washer to act as the ring, or can be integral with the spring washer such that the slot appears not to pass completely through the washer strip.

This slotted conical spring washer greatly increases the elastic spring travel available during repeated clamping cycles and during movement of clamped members due to differences in rates of thermal expansion and thermal gradients. A method for using the slotted spring washer fastening system invention assures electrical conductance and/or fluid vessel integrity under high temperatures and thermal gradients and when different materials are used in the clamped and clamping members.

23 Claims, 5 Drawing Sheets

{PAGE_START}
SLOTTED CONICAL SPRING WASHER

FIELD OF THE INVENTION

This invention relates to the field of spring washers as they are used with fasteners and in fastening systems.

BACKGROUND OF THE INVENTION

Conical spring washers (Belleville washers) are used in fastening systems to assure that a compressive force is maintained on the clamped members throughout the intended service cycle. Once compressed the conical spring washer continuously produces a force exerted on its immediately adjoining members (a separating force). When a conical spring washer is compressed between a bolt head or nut securing a clamped member and the clamped member, the separating force of the conical spring washer assists in clamping the clamped member. The spring washer's effective operating travel produces and maintains a force on clamped members when there is differential movement (strain) between and among the clamped members and the clamping member, e.g., a bolt.

There is an expectation that the effective operating travel (available deflection) and corresponding force needed to fully compress the conical spring can always be completely recovered when the washer is not compressed. In practice, the effective operating travel (or deflection) is limited because the compressive hoop stress (the bending stress at the convex inner edge) of the washer ("C" - FIG. 4) typically exceeds the compressive yield strength of the washer material at very small deflection values. Likewise, the tensile hoop stress (the bending stress at the outer edge) ("T") typically exceeds the tensile strength of the washer material at these small deflections. If either or both of these situations occur, the washer material reaches the plastic state; the washer does not return to its original form and loses some or all of its spring properties.

Ideally Belleville spring washers are used to maintain a predefined clamping force on the clamped members within a predetermined range of differential motion of the member on each side of the washer. Alternatively, Belleville washers are also used in applications where they are initially flattened but become the predominant clamping force when the clamped and clamping members experience conditions that cause them to lose their initial stress (for example when the members are subjected to vibration and/or to temperature changes and thermal gradients causing differential expansion and/or contraction of members).

The large thermal cycles and gradients (approx. 300° C.) between components experienced in processing semiconductor wafers (at normal temperatures of 400°–500° C.) can and do cause fastening systems unable to accommodate the differential movement to fail (e.g., causing loss of electrical conductance and/or loss of vessel pressure integrity).

An increase in the range of the fastening system is needed to avoid these failures, and to support processes that operate faster and therefore generate potentially larger thermal cycles and gradients between clamped and clamping members than the existing processes. The spring (elastic) properties of the washer must be present throughout its available deflection range and stresses causing the washer to plastically deform must be avoided.

SUMMARY OF THE INVENTION

A structure and system of this invention provide for an increased range of available deflection in applications where Belleville washers may have been used in the past.

A split or slot is provided in one side of a conical (domed, convex, or other non-flat) spring washer. The split or slot releases the constraints on compressive and tensile hoop stresses that cause the material in a Belleville spring washer to yield and plastically deform.

A ring encircling the outside diameter of the slotted spring washer prevents the split conical spring washer (also known as a strip or band encircling a bore) from seeking its lowest energy condition and unravelling as it is being compressed.

The ring constraining the outside diameter of the spring washer can be a flat washer with a peripheral flange. The flange will act as a ring to constrain the washer or strip from radially moving away from the center of the bore of the washer.

The ring can also be part of the member to be clamped. A counter bore can be provided in the member to be clamped around the hole for the clamping member (bolt or stud). When the slotted spring washer is placed in this counter bore, the radial movement of the outside diameter of the washer or strip or band is restricted.

The ring can also be integral with the conical spring washer. The split or slot in the conical spring washer in this configuration appears not to go all the way through from the inside diameter of the washer to the outside diameter. The ring constraining the outside diameter of the ring is integral and continuous with the outside diameter of the spring washer. The two ends of the washer strip or band are connected by a portion of the ring called a tie at the outside diameter of the washer across the slot. Sharp corners, where the end of the slot meets the tie portion of the ring, could produce stress concentrations resulting in premature failure of the ring. Long radiuses and smooth transitions are used to avoid stress concentration factors.

In semiconductor wafer processing where there are high temperature and repeated thermal cycling and thermal gradients, there are also severe chemical environments. Therefore, the slotted conical spring washer should be constructed of a material that is not severely degraded by such an environment, such as Inconel, nickel plated Inconel, Hastalloy, Haynes alloys, or other material with suitable chemical resisting and mechanical strength properties at high temperatures.

It is preferable that the slotted washer material have a yield strength in excess of 100 ksi (7030 Kg/cm)) at operating temperature.

In applications with high temperatures and repetitive thermal cycling, the slotted conical spring washer fastening system can be effectively used to increase the clamping performance of clamping systems by utilizing the slotted spring washer in a method to assure that electrical or fluid tight connections between components are maintained. The steps of the method include: assembling a set of members to be clamped in the position which the members are to be clamped, placing the slotted spring washer fastening system at an end of a clamping member (bolt, stud or other rod like member), and compressing the slotted spring washer together with the set of members to be clamped and securing the clamping members where they provide a predetermined clamping force to said members to be clamped including the slotted spring washer.

DETAILED DESCRIPTION

A spring washer fastening system and method according to the invention provide operational and design advantages over the prior art. The stresses in the washer remain in the elastic range of the materials used throughout the load range, even when the washer is flattened. The spring washer system can be used repeatedly in applications where a greatly increased operable spring range is desired over many hundreds of cycles before replacement. A washer according to the invention will also occupy less space than similarly performing prior art washers. Member sizes can be reduced when fasteners occupy less space.

Figure 4:
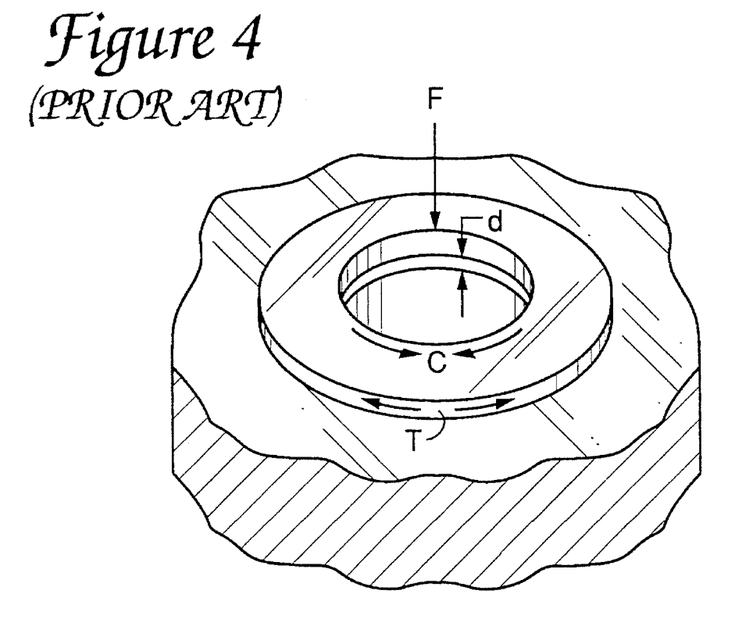
FIG. 4 is a perspective view of a prior art Belleville washer.
Figure 5A:
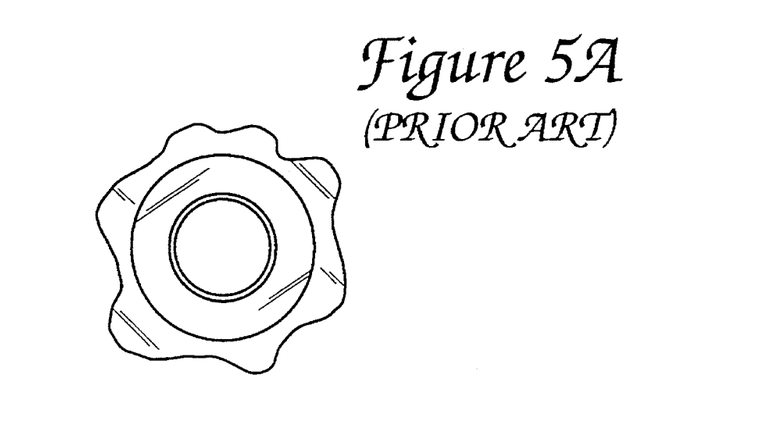
FIGS. 5A and 5B are top and cross sectional views of the prior art shown in FIG. 4.
Figure 5B:
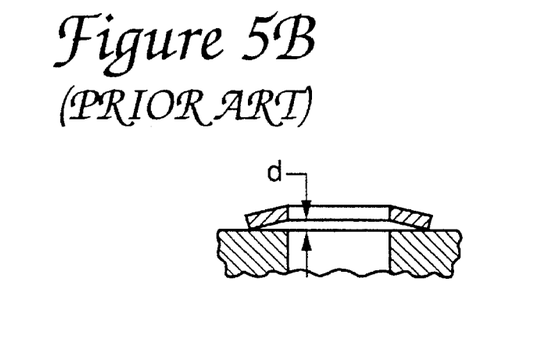

The standard Belleville washer as shown in FIGS. 4, 5A, and 5B in their standard configuration are constructed with available deflections "d" (as seen in Table A below) between 0.006 and 0.015 inches (0.152 and 0.381 mm) when manufactured. However, when the actual deflection of the Belleville washer exceeds 0.003 inches (0.076 mm), the hoop stress in the washer exceeds the yield strength of the material. This means that when a new washer is deflected more than 0.003 inches (0.076 mm), the washer material will plastically deform and the washer can only recover approximately 0.003 inches (0.076 mm) from its maximum deflection. When completely flattened the maximum elastic recovery is also approximately 0.003 inches (0.076 mm) and no more. For washers having an apparent available deflection of 0.015 inches (0.381 mm) when new, the actual usable available deflection is only 0.003 inches (0.076 mm).

When the washer is split or slotted and the outside diameter of the washer is constrained to prevent radial expansion, the washer hoop stress will not exceed its yield strength (when the ends of the washer adjacent to the slot or split do not plastically interfere) and the full elastic range of the washer can be used repeatedly. In a slotted washer whose outside diameter is held by an encircling ring, a washer having an initial available deflection "d" of 0.015 inches (0.381 mm) will continue to have that same available working deflection of 0.015 inches (0.381 mm) after 1, 100, or 1000 tightenings. A conical spring washer fastening system when configured according to this invention is capable of having a available deflection five times (5×) (0.015 in. vs. 0.003 in.) (0.381 mm vs. 0.76 mm) greater than previously used Belleville washers of the same general dimension and configuration. A comparison among several Belleville washer #1–#3 and a slotted washer according to the invention #4 is provided in Tables A.

TABLE A

| | | | Washer # | | | |
|---|---|---|---|---|---|---|
| #1 | #2 | #3 | | | | #4 |
| | | | (English) | | | |
| 0.375 | 0.375 | 0.38 | Outside Diam | OD | in | 0.38 |
| 0.19 | 0.19 | 0.21 | Inside Diam | ID | in | 0.21 |
| 0.015 | 0.03 | 0.03 | Mat'l Thickness | t | in | 0.03 |
| 0.27 | 0.036 | 0.045 | Free Height | H | in | 0.045 |
| 0.012 | 0.006 | 0.015 | Available Deflection | d | in | 0.015 |
| 0.003 | 0.002 | 0.002 | Deflection | f | in | .000–.015 |
| 19.7 | 75.7 | 91.9 | Load | P | lb (f) | 0—600 |
| 137 | 129 | 157 | Bending Stress | S | ksi | <<100 |
| | | | (Metric) | | | |
| 9.525 | 9.525 | 9.652 | Outside Diam | OD | mm | 9.652 |
| 4.826 | 4.826 | 5.334 | Inside Diam | ID | mm | 5.334 |
| 0.381 | 0.762 | 0.762 | Mat'l Thickness | t | mm | 0.762 |
| 6.858 | 0.914 | 1.143 | Free Height | H | mm | 1.143 |
| 0.305 | 0.152 | 0.381 | Available Deflection | d | mm | 0.381 |
| 0.076 | 0.051 | 0.051 | Deflection | f | mm | .000–.381 |
| 8.934 | 34.33 | 41.68 | Load | P | kg (f) | 0—272 |
| 9630 | 9068 | 11036 | Bending Stress | S | kg/cm² | <<7030 |

Note in Belleville Washers #1 through #3, Hoop Stress > Yield Strength at deflection >.003 inches (0.76 mm).

TABLE A shows the maximum loads available for the available deflections. The load bending stress versus deflection relationships for a slotted washer according to the invention as shown in column #4 of TABLE A are approximated according to calculations in TABLE B.

TABLE B

(English)

| Deflection in | Load lbs | Bending Stress psi |
| --- | --- | --- |
| 0.001 | 47 | 10 |
| 0.002 | 92 | 20 |
| 0.003 | 135 | 30 |
| 0.004 | 177 | 40 |
| 0.005 | 218 | 50 |
| 0.006 | 257 | 60 |
| 0.007 | 295 | 70 |
| 0.008 | 332 | 80 |
| 0.009 | 368 | 90 |
| 0.01 | 404 | 100 |
| 0.011 | 439 | 110 |
| 0.012 | 473 | 120 |
| 0.013 | 507 | 130 |
| 0.014 | 540 | 140 |
| 0.015 | 574 | 150 |

(Metric)

| Deflection mm | Load kg | Bending Stress kg/cm$^2$ |
| --- | --- | --- |
| 0.025 | 21 | 0.7 |
| 0.051 | 42 | 1.4 |
| 0.076 | 61 | 2.1 |
| 0.102 | 80 | 2.8 |
| 0.127 | 99 | 3.5 |
| 0.152 | 117 | 4.2 |
| 0.178 | 134 | 4.9 |
| 0.203 | 150 | 5.6 |
| 0.229 | 167 | 6.3 |
| 0.254 | 183 | 7.0 |
| 0.279 | 199 | 7.7 |
| 0.305 | 214 | 8.4 |
| 0.330 | 230 | 9.1 |
| 0.356 | 245 | 9.8 |
| 0.381 | 260 | 10.5 |

As can be seen in TABLE B, the available clamping force at high deflections exceeds the force available from a standard Belleville washer by several times.

Belleville or other spring type washers can be combined or chosen to achieve the force and usable available deflection required for given applications. However, the space required to utilize prior art spring washers for a given application is large compared to the space required to achieve the same performance from a washer (fastening) configuration according to the invention. For example, when using a prior art spring washer a set of given conditions can only be achieved if a 0.625 in. (15.875 mm) or 0.75 in. (19.05 mm) outside diameter spring washer is used. To achieve approximately the same conditions in the same environment, a washer configuration according to the invention would require only a 0.375 in. (9.525 mm) outside diameter washer. In many installations there is a severe limitation on space available for fasteners or conversely component size and resulting cost can be substantially reduced if smaller size fastener systems can be used to achieve the same required performance. In configurations according to the invention the material thickness can be increased to increase the maximum washer force available, without reaching the yield strength of the washer material. Increasing the material thickness in the prior art washers would cause the washer material to reach its yield strength at smaller deflections than those which cause yielding in thinner washers. Washers according to the invention provide a substantial advantage in space utilization, while achieving equal or better operating performance, than prior art washers.

Various configurations of the invention are shown in the figures.

Figures 1, 2A, 2B, 3A, 3B, 3C:
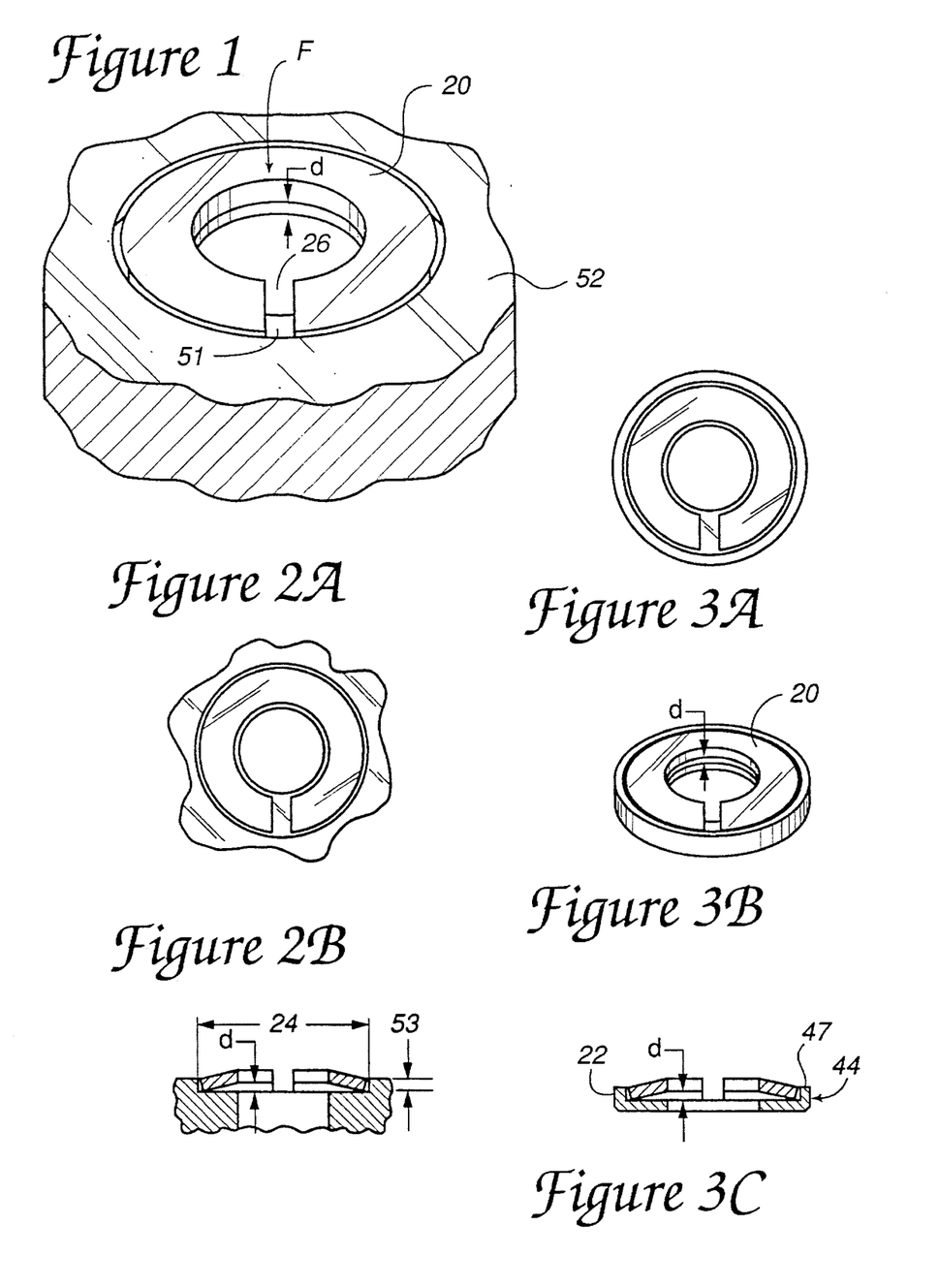
FIG. 1 is a perspective view of an example of the invention in a slotted washer—counter bore configuration.
FIGS. 2A and 2B are top and cross sectional views of FIG. 1.
FIGS. 3A, 3B, and 3C are a top, perspective, and cross sectional view of an example of the invention in a slotted washer—retainer washer configuration

An embodiment of the invention is shown in FIG. 1. A conical (or domed) slotted (or split) spring washer 20 is disposed in the counter bore 51 of a member to be clamped 52. A clamping member (such as a bolt) exerts a force "F" on the washer 20. The available deflection "d" of the washer can be observed at the inside diameter of the washer 20. The washer 20 consists of a generally flat strip or band of material 30 encircling a bore 37 (FIG. 8) or a curved strip or band of material 30A encircling the bore 37, creating a domed shape (FIG. 8A). When a load is placed on the washer 20, the slot 26 between a first end 31 of the strip 30 and the second end 32 of the strip (FIG. 7) tends to open up, if not restrained, to accommodate the force. The outside diameter 21 of the washer 20 is constrained by the inside diameter of the counter bore 24 (FIG. 2B), which forms a ring 22 to prevent the washer strip 30 from expanding. For use in high temperatures and corrosive environments, the strip is generally made of material suitable for an extended life in those environments.

Figure 11:
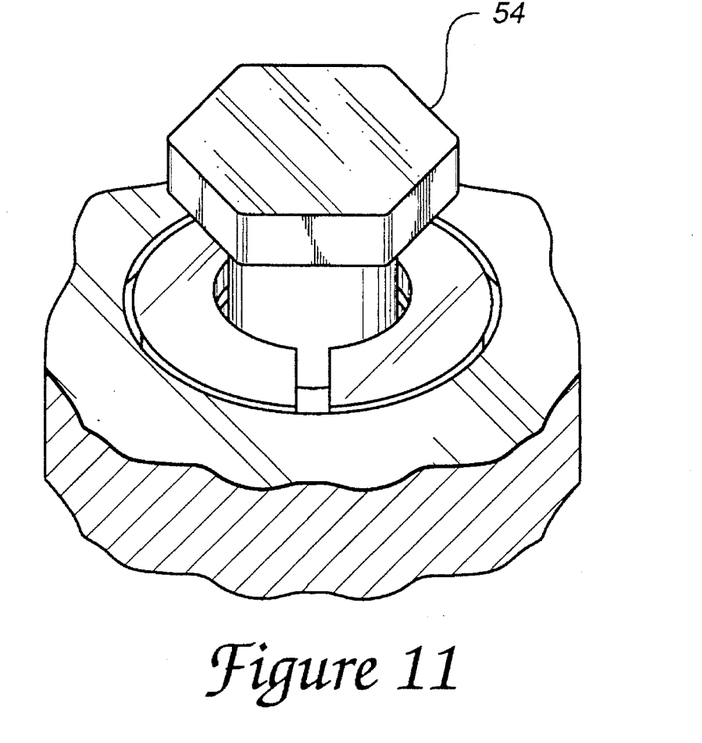
FIG. 11 shows a clamping member in position in the embodiment of FIG. 1.

FIG. 11 shows the embodiment of FIG. 1 with a clamping member (bolt) 54 in position to be fastened.

The strip can be a generally flat material which has been formed into a cone or dome shape and is preferably made of Inconel-750 which has been annealed, heat treated to full spring temper and has a sulfamate nickel electroplate finish 0.003–0.005 in. (0.076–0.127 mm) thick.

Figure 7:
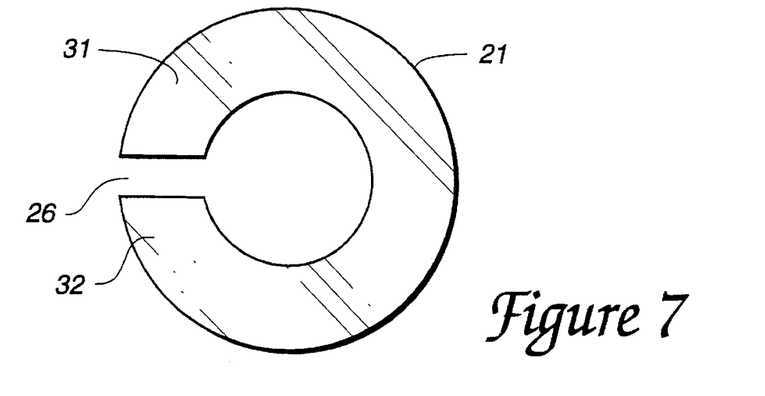
FIG. 7 is top view of a washer of an example of the invention.
Figure 8:
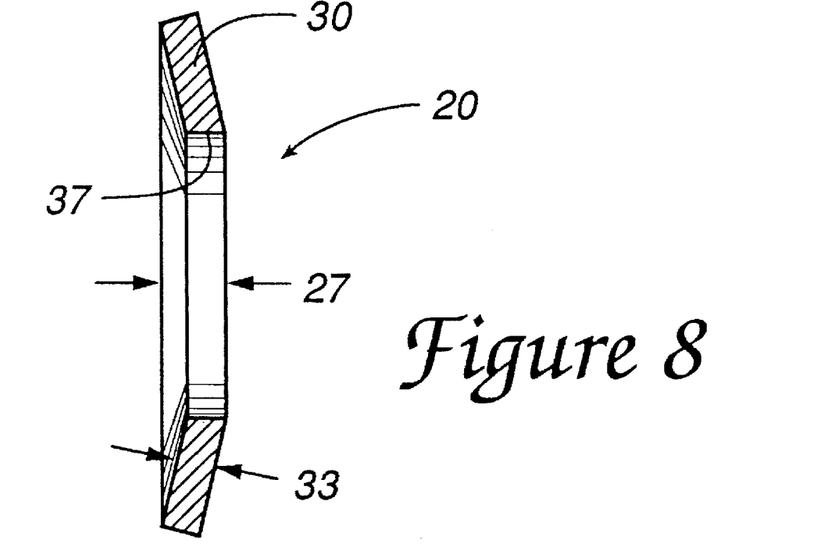
FIG. 8 is a cross sectional view of FIG. 7.
Figure 8A:
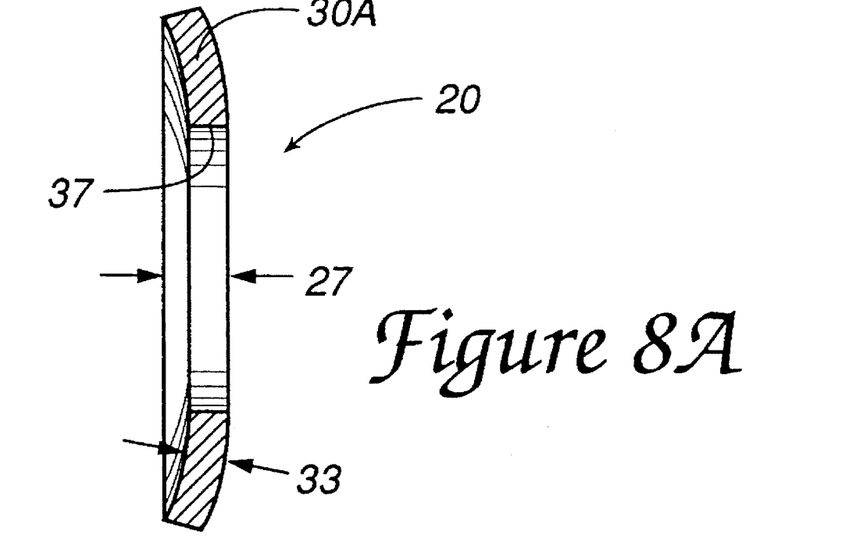
FIG. 8A is an alternative cross-sectional view of FIG. 7.
Figure 9:
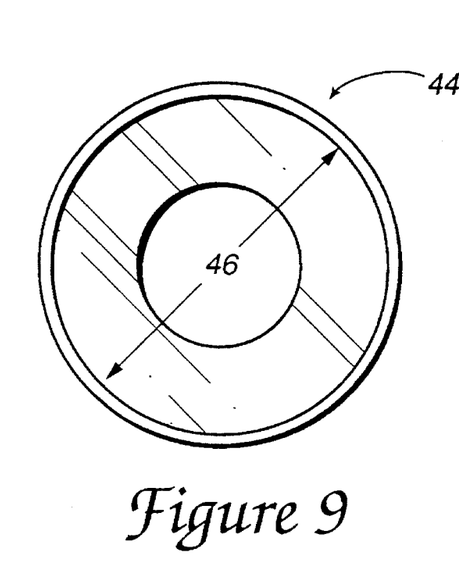
FIG. 9 is top view of a retaining washer in an example of the invention.
Figure 10:
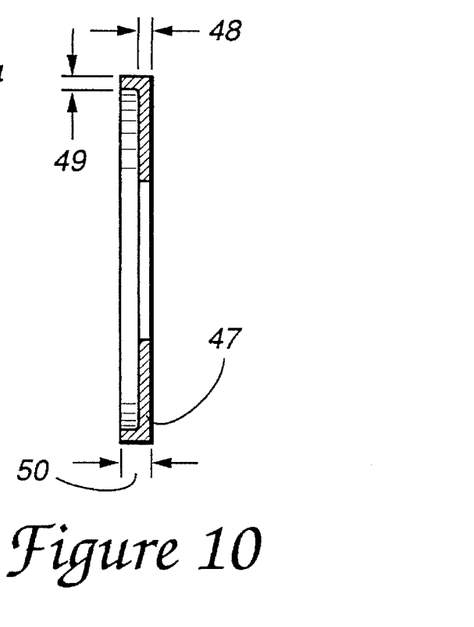
FIG. 10 is a cross sectional view of FIG. 9.

As pictured in FIGS. 7, 8, and 8A in a workable configuration the slotted washer has an outside diameter of 0.380+0.005/−0.010 in. (9.652+0.127/−0.254 mm), an inside diameter of 0.210 in. (0.533 mm), a slot width of 0.045±0.015 in. (1.143±0.381 mm), a strip thickness (33) of 0.030±0.0015 in. (0.762±0.004 mm), and an overall free thickness (27) of 0.045±0.003 in. (1.143±0.076 mm) as shown in FIGS. 9 and 10. The retainer washer has an outside diameter of 0.432±0.002 in. (10.973±0.05 mm), and inside diameter of 0.210 in. (0.533 mm), a flanged bore inside diameter (46) of 0.392±0.002 in. (9.96±0.051 mm), flat washer thickness (48) of 0.020 in. (0.508 mm), and a flange height of 0.030 in. (9.76 mm). (This is the basic configuration of a standard #10 washer).

In normal use the washer outside diameter is larger than the largest dimension of a bolt, screw, or nut head. Therefore, in normal use, there can be no interference between the bold, screw, or nut head and the counter bore in which the washer is placed. However, if a bolt, screw, or nut head is used that protrudes over the outside edge of the washer, care must be taken to be sure that the configuration provides no interference between pieces.

When a counter bore has not been provided in the member to be clamped, a retaining washer ring 44 can be used (FIGS. 3A, 3B, 3C, 9, and 10). The retaining washer 44 includes a ring 22 to restrain the expansion of the slotted spring washer 20. The ring 22 is formed by an flat disk washer having an annular flange 47. The flat disk has a center hole that centers the annular flange (ring) on the bolt hole. In one configuration, the flange height 50 in excess of the flat disk thickness 48 approximately equals the washer strip material thickness, e.g., 0.030 in. (0.762 mm), the flat washer thickness 48 is 0.020 in. (0.508 mm) and the flange thickness 49 is approximately 0.040 in. (1.016 mm).

The preferred clearance between the inside diameter of the retaining ring (whether it be a counter bore inside diameter or a retaining ring inside diameter) and the outside diameter of the slotted conical washer is approximately 0.005 to 0.025 in. (0.127 to 0.635 mm). To prevent binding the clamping member (bolt) on the inside diameter of the washer there should be a minimum 0.015 in. (0.381 mm) clearance between the outside diameter of the bolt and the inside diameter of the washer bore.

While it is preferred that there be a clearance between the outside diameter of the slotted spring washer and inside diameter of the ring (either a counter bore or a retaining washer) into which the washer is placed, equal diameters or even an interference fit will work, provided the two ends of the washer on either side of the slot do not interfere with each other so as to cause the material stress of the washer to exceed its yield strength.

Figure 6:
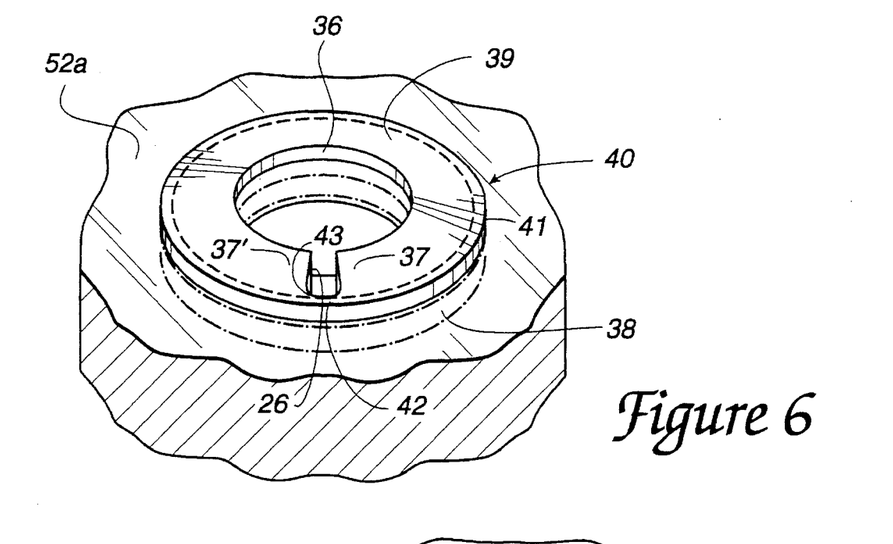
FIG. 6 is a perspective view of an example of the invention in a slotted washer with integral retaining ring configuration.

The slotted spring washer and its encircling ring can be integrally formed as shown by the configuration pictured in FIG. 6. The integral washer/ring 40 includes a washer portion 39 (conical spring washer split on one side having an outside diameter or a washer having a strip substantially encircling a bore 36, forming the a surface of a cone generally centered on the bore and having a first strip end 37 separate from and adjacent to a second strip end 38) and a ring portion 41 (washer retaining member or washer retaining ring having an inside dimension encircling the outside diameter). There is a tie 42 (part of the ring portion 41) between the two edges of the outside diameter of the washer portion 39. This integrally formed washer 40 no longer requires a separate counterbore or retaining washer, that is, the two pieces are integral. They therefore can sit on top of flat member to be clamped 52a as pictured in FIG. 6. As pictured in FIG. 6 the imaginary dashed line shown separates the washer portion 39 from the ring portion. Carefully formed radiuses 43 and smooth transitions (produced for example by precision grinding) are some of the techniques that are used to reduce stress concentration factors at the potentially sharp transitions between the slot 26 (produced by stamping or grinding or other suitable means to achieve the configuration shown without deleteriously affecting the material's heat treatment) and the tie 42. A flat washer 38 (as shown in dotted lines) can be provided on one side of the washer to act as a shield to prevent the washer edges from digging into and damaging the material of the member to be clamped when the material is soft (e.g. aluminum with a low yield stress).

Figure 6A:
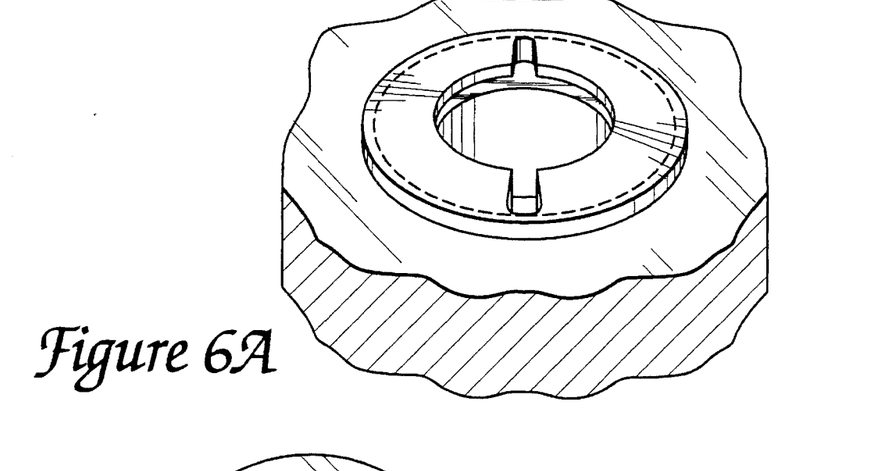
FIG. 6A repeats FIG. 6 with a second slot shown in the slotted washer.

It is possible to put more than one slot in the washer band of the configuration of FIG. 6 (as shown in FIG. 6A), but each additional slot produced by stamping or grinding or other suitable means to achieve the configuration shown without deleteriously affecting the material's heat treatment reduces the material area available to support a load and reduces the washer internal stresses which are a substantial factor contributing to the washer's load bearing capacity.

While the invention has been described with regards to specific embodiments, those skilled in the art will recognize that changes can be made in form and detail without departing from the spirit and scope of the invention.

We claim:

1. A fastener component comprising:
    a conical spring washer split on one side having generally parallel inside and outside conical surfaces, said washer having an outside diameter,
    a washer retaining member having a continuous ring, an inside dimension of said ring encircling said outside diameter of said washer, said ring being disposed to restrict the radial movement of said outside diameter of said washer away from a center axis of said washer.

2. A fastener component as in claim 1, wherein said washer is integral with said ring, said ring forming an integral continuation of said washer outside said outside diameter of said washer.

3. A fastener component according to claim 1, wherein said washer is separate from said washer retaining member prior to assembly of said fastener component.

4. A fastener component according to claim 3, wherein said washer retaining member is separate from said washer and a set of members to be clamped using the fastener component prior to assembly of said fastener component.

5. A fastener component comprising:
    a washer having a strip having a substantially rectangular cross section, said strip substantially encircling a bore, said strip forming a surface of a cone generally centered on said bore, said strip having a first strip end separate from and adjacent to a second strip end, said strip having an outside diameter;
    a washer retaining ring having an inside dimension encircling said outside diameter of said strip, said ring being disposed to restrict the radial movement of said outside diameter of said strip away from a center axis of said bore.

6. A fastener component as in claim 5, wherein said strip is integral with said ring, said ring forming an integral continuation of said strip outside said outside diameter of said strip and providing a tie between said first strip end and said second strip end at said outside diameter.

7. A fastener component as in claim 6, wherein said tie between said first strip end and said second strip end is formed to avoid stress concentration factors.

8. A fastener component as in claim 5, wherein said washer ring is formed by an inside diameter of a counter bore in a member to be clamped.

9. A fastener component as in claim 1, wherein said generally parallel inside and outside surfaces form a dome shape.

10. A fastener as in claim 9 wherein said washer is a continuous band separated at said split, said band having a shape formed by turning a cross section of the washer uniformly around the central axis of said washer.

11. A fastener as in claim 9, which substantially achieves the deflection-load relationship identified in Table B for a spring washer substantially having the dimensions identified in column #4 of Table A.

12. A fastener component comprising:
    a washer having a strip substantially encircling a bore, said strip forming a surface of a cone generally centered on said bore, said strip having a first strip end separate from and adjacent to a second strip end, said strip having an outside diameter;
    a washer retaining ring having an inside dimension encircling said outside diameter of said strip, said ring being disposed to restrict the radial movement of said outside diameter of said strip away from a center axis of said bore;
    wherein said washer ring includes a flat disk washer having an annular flange at an outside diameter of said disk, where an inner surface of said annular flange encircles said outside diameter of said strip to restrict its radial movement.

13. A fastener component as in claim 12, wherein said strip itself has a generally flat cross section.

14. A fastener component comprising:
    a washer having a strip substantially encircling a bore, said strip forming a surface of a cone generally centered on said bore, said strip having a first strip end separate from and adjacent to a second strip end, said strip having an outside diameter;

a washer retaining ring having an inside dimension encircling said outside diameter of said strip, said ring being disposed to restrict the radial movement of said outside diameter of said strip away from a center axis of said bore;

wherein said washer ring is formed by an inside diameter of a counter bore in a member to be clamped, wherein a depth of said counter bore substantially equals a thickness of the strip itself.

15. A fastener component as in claim 14, wherein said strip itself has a generally flat cross section.

16. A fastener comprising:

a conical spring washer having a split therein on only one side thereof, wherein said split extends substantially but not completely through a side of said washer from an inside bore of said washer toward an outside diameter of said washer.

17. A fastener component comprising:

a washer having a strip substantially encircling a bore, said strip forming a surface of a cone generally centered on said bore, said strip having a first strip end separate from and adjacent to a second strip end, said strip having an outside diameter;

a washer retaining ring having an inside dimension encircling said outside diameter of said strip, said ring being disposed to restrict the radial movement of said outside diameter of said strip away from a center axis of said bore wherein said strip is integral with said ring, said ring forming an integral continuation of said strip outside said outside diameter of said strip and providing a tie between said first strip end and said second strip end at said outside diameter;

further comprising a generally flat washer disposed against one side of said strip.

18. A fastener as in claims 16 further comprising a generally flat washer disposed against one side of said washer.

19. A fastener component comprising:

a conical spring washer split on one side, said washer having an outside diameter, a washer retaining member having a counter bore cavity therein forming a continuous ring, an inside dimension of said ring encircling said outside diameter of said washer, said ring being disposed to restrict the radial movement of said outside diameter of said washer away from a center axis of said washer.

20. A fastener component as in claim 19, wherein said washer forms a dome shape.

21. The fastener as in claim 20, wherein said washer is a continuous band separated at said split, said band having a shape formed by turning a cross section of the washer uniformly around the central axis of said washer.

22. A fastener as in claim 20, which substantially achieves the deflection-load relationship identified in Table B for a spring washer substantially having the dimensions identified in column #4 of Table A.

23. A method of assuring electrical connections between components which are clamped together and electrically connected by a bolt type fastening system in high temperature and frequent thermal cycling environments comprising the steps of:

assembling a set of members to be clamped in the position which the members are to be clamped;

assembling a fastener component comprising;

a conical spring washer split on one side, said washer having an outside diameter, a washer retaining member having a continuous ring, an inside dimension of said ring encircling said outside diameter of said washer, said ring being disposed to restrict the radial movement of said outside diameter of said washer away from a center axis of said washer at an end of a clamping member for compressing said set of members to be clamped;

compressing the washer together with the set of members to be clamped as the clamping member compresses the set of members to be clamped and is secured at position where the clamping member provides a predetermined clamping force to said members to be clamped and said fastener component.

* * * * *